United States Patent
Ma et al.

(10) Patent No.: US 12,155,782 B2
(45) Date of Patent: Nov. 26, 2024

(54) CALL METHOD AND TERMINAL, AND NON-TRANSITORY COMPUTER-READABLE STORAGE MEDIUM

(71) Applicants: Beijing BOE Technology Development Co., Ltd., Beijing (CN); BOE Technology Group Co., Ltd., Beijing (CN)

(72) Inventors: Mingyuan Ma, Beijing (CN); Yongda Ma, Beijing (CN); Ken Wen, Beijing (CN); Honglei Zhang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/637,816

(22) PCT Filed: Mar. 29, 2021

(86) PCT No.: PCT/CN2021/083531
§ 371 (c)(1),
(2) Date: Feb. 24, 2022

(87) PCT Pub. No.: WO2022/204861
PCT Pub. Date: Oct. 6, 2022

(65) Prior Publication Data
US 2024/0106922 A1    Mar. 28, 2024

(51) Int. Cl.
*H04M 1/724* (2021.01)
*H04M 1/00* (2006.01)
(Continued)

(52) U.S. Cl.
CPC ....... *H04M 1/006* (2013.01); *H04M 1/72469* (2021.01); *H04M 1/72484* (2021.01)

(58) Field of Classification Search
CPC ............. H04M 1/006; H04M 1/72469; H04M 1/72484
(Continued)

(56) References Cited

U.S. PATENT DOCUMENTS

2016/0381534 A1    12/2016 Kwon et al.

FOREIGN PATENT DOCUMENTS

| CN | 103595871 A | 2/2014 |
| CN | 103595949 A | 2/2014 |

(Continued)

OTHER PUBLICATIONS

Extended European Search Report for EP21933485.1 Mailed May 9, 2023.
(Continued)

*Primary Examiner* — Ahmad F. Matar
*Assistant Examiner* — Jirapon Tulop
(74) *Attorney, Agent, or Firm* — Ling Wu; Stephen Yang; Ling and Yang Intellectual Property

(57) ABSTRACT

The present disclosure provides a call method and terminal, and a non-transitory computer-readable storage medium. The call method includes: receiving or initiating, by a first terminal, a call request to establish a call with a second terminal; detecting, by the first terminal, at least one of the following: a current task being executed by the first terminal, whether there is one or more third terminals capable of assisting in the call, and a current task being executed by a third terminal; and selecting whether a display interface of the first terminal displays a call assisting option according to the current task being executed by the first terminal and/or the current task being executed by the third terminal; wherein the call assisting option is used to prompt a user to select to answer the call with the second terminal through the assistance of the third terminal.

15 Claims, 12 Drawing Sheets

(51) Int. Cl.
*H04M 1/72469* (2021.01)
*H04M 1/72484* (2021.01)

(58) Field of Classification Search
USPC .......................................................... 455/417
See application file for complete search history.

(56) References Cited

FOREIGN PATENT DOCUMENTS

| | | | | | |
|---|---|---|---|---|---|
| CN | 105511961 | A | 4/2016 | | |
| CN | 105704692 | A | 6/2016 | | |
| CN | 107172286 | A | 9/2017 | | |
| CN | 108632560 | A | 10/2018 | | |
| CN | 109561217 | A | 4/2019 | | |
| CN | 110138937 | A | 8/2019 | | |
| CN | 110430323 | A | 11/2019 | | |
| CN | 111182138 | A | 5/2020 | | |
| JP | 2007221477 | A | * | 8/2007 | |
| WO | WO-2015074600 | A1 | * | 5/2015 | .............. H04M 3/58 |
| WO | WO-2020224486 | A1 | * | 11/2020 | ............ H04M 1/026 |

OTHER PUBLICATIONS

Office Action dated May 23, 2024 for Chinese Patent Application No. 202180000615.2 and English Translation.

* cited by examiner

CALL METHOD AND TERMINAL, AND NON-TRANSITORY COMPUTER-READABLE STORAGE MEDIUM

CROSS-REFERENCE TO RELATED APPLICATION

The present application is a U.S. National Phase Entry of International Application No. PCT/CN2021/083531 having an international filing date of Mar. 29, 2021, the entire content of which is hereby incorporated by reference.

TECHNICAL FIELD

Embodiments of the present disclosure relate to, but are not limited to, the technical field of communications, and particularly to a call method and terminal, and a non-transitory computer-readable storage medium.

BACKGROUND

With the development of the mobile Internet and the improvement of people's living standard, mobile phones have become a necessity for people's daily life and work. With mobile phones, people may communicate or keep in contact with others anytime and anywhere. But sometimes a speaker, microphone, and display screen etc. of a mobile phone are occupied by some other application software such as a game application, and it is inconvenient for a user to answer or make a call while processing such an application.

SUMMARY

The following is a summary about the subject matter described in the present disclosure in detail. The summary is not intended to limit the scope of protection of the claims.

The present disclosure provides a call method, including: receiving or initiating, by a first terminal, a call request to establish a call with a second terminal; detecting, by the first terminal, at least one of the following: a current task being executed by the first terminal, whether there is one or more third terminals capable of assisting in the call, and a current task being executed by a third terminal; and selecting whether a display interface of the first terminal displays a call assisting option according to the current task being executed by the first terminal and/or the current task being executed by the third terminal; wherein the call assisting option is used to prompt a user to select to answer the call with the second terminal through the assistance of the third terminal.

In an exemplary embodiment, the selecting whether the display interface of the first terminal displays the call assisting option according to the current task being executed by the first terminal and/or the current task being executed by the third terminal includes: controlling a screen of the first terminal to display a first interface when the current task being executed by the first terminal is a first-level task, the first interface including an answer option, a reject option and the call assisting option; and controlling the screen of the first terminal to display a second interface when the current task being executed by the first terminal is a second-level task, the second interface including an answer option and a reject option, without the call assisting option, wherein a priority of the first-level task is higher than that of the second-level task, and the first terminal includes any one or more of the following components: a microphone, a speaker, and a display screen.

In an exemplary embodiment, the selecting whether the display interface of the first terminal displays the call assisting option according to the current task being executed by the first terminal and/or the current task being executed by the third terminal includes: controlling a screen of the first terminal to display a first interface when the current task being executed by the third terminal is a third-level task, the first interface including an answer option, a reject option and the call assisting option; and controlling the screen of the first terminal to display a second interface when the current task being executed by the third terminal is a fourth-level task, the second interface including an answer option and a reject option, without the call assisting option, wherein a priority of the fourth-level task is higher than that of the third-level task, and the third terminal includes any one or more of the following components: a microphone, a speaker, and a display screen.

In an exemplary embodiment, when there are multiple third terminals, the method further includes: acquiring, by the first terminal, position information of the multiple third terminals, and determining a display sequence of multiple call assisting options corresponding to the multiple third terminals on the display interface of the first terminal according to the position information of the multiple third terminals, wherein the multiple third terminals correspond to the multiple call assisting options one to one.

In an exemplary embodiment, the method further includes: receiving a first instruction, the first instruction being used to request answering the call with the second terminal through the assistance of the third terminal; wherein the call is implemented among the first terminal, the second terminal and the third terminal in any one of the following ways: collecting and sending, by the first terminal, first voice data to the third terminal for the third terminal to transmit the first voice data to the second terminal, and receiving and playing, by the third terminal, second voice data transmitted by the second terminal; collecting and transmitting, by the third terminal, first voice data to the second terminal, and receiving and playing, by the third terminal, second voice data transmitted by the second terminal; collecting and transmitting, by the third terminal, first voice data to the second terminal, receiving and sending, by the third terminal, second voice data transmitted by the second terminal to the first terminal, and playing, by the first terminal, the second voice data; or, collecting and sending, by the first terminal, first voice data to the third terminal for the third terminal to transmit the first voice data to the second terminal, receiving and sending, by the third terminal, second voice data transmitted by the second terminal to the first terminal, and playing, by the first terminal, the second voice data.

In an exemplary embodiment, the method further includes: receiving a first instruction, the first instruction being used to request answering the call with the second terminal through the assistance of the third terminal; wherein the call is implemented among the first terminal, the second terminal and the third terminal in any one of the following ways: receiving and transmitting, by the first terminal, first voice data collected by the third terminal to the second terminal, and receiving and sending, by the first terminal, second voice data transmitted by the second terminal to the third terminal for the third terminal to play the second voice data; collecting and transmitting, by the first terminal, first voice data to the second terminal, and receiving and sending, by the first terminal, second voice data transmitted by the second terminal to the third terminal for the third terminal to play the second voice data; or, receiving and transmitting, by the first terminal, first voice data collected by the third terminal to the second terminal, and receiving and playing, by the first terminal, second voice data transmitted by the second terminal.

In an exemplary embodiment, in a process that the call with the second terminal is answered through the assistance of the third terminal, the method further includes: detecting, by the first terminal, a distance between the first terminal and the third terminal currently assisting in the call, and controlling a screen of the first terminal to display a switching prompting interface when the distance between the first terminal and the third terminal currently assisting in the call is greater than a first distance threshold, wherein the switching prompting interface is used to prompt switching the third terminal in the call with the second terminal.

In an exemplary embodiment, in a process that the call with the second terminal is transferred to the third terminal, the method further includes: detecting, by the first terminal and/or the third terminal, a quality of voice information in a current call process, the quality of voice information including at least one of a data delay, packet loss or jitter, and controlling a screen of the first terminal and/or the third terminal to display a switching prompting interface when the quality of voice information in the current call process is lower than a preset first quality threshold of voice information, wherein the switching prompting interface is used to prompt switching the third terminal in the call with the second terminal.

In an exemplary embodiment, in a process that the call with the second terminal is answered through the assistance of the third terminal, the method further includes at least one of the following: receiving, by the first terminal, a type of the current task being executed by the third terminal, and when the current task being executed includes an executed task conflicting with a current call process, sending, by the first terminal, a notification of suspending the executed task conflicting with the current call process to the third terminal; or receiving, by the first terminal, a type of the current task being executed by the third terminal, and controlling a screen of the first terminal to display a privacy protection prompting interface when the current task being executed includes an executed task except a current call process, wherein the privacy protection prompting interface is used to prompt the user to mind privacy protection.

In an exemplary embodiment, the method further includes: receiving a second instruction, the second instruction being used to instruct to answer the call with the second terminal through the first terminal; and controlling a screen of the first terminal to display a screen projection prompting interface; wherein the screen projection prompting interface is used to prompt whether the current task being executed by the first terminal needs to be pushed to the third terminal to be played.

In an exemplary embodiment, the current task being executed is a video playing task or a game task.

In an exemplary embodiment, the method further includes: receiving a second instruction, the second instruction being used to indicate to answer the call with the second terminal through the first terminal; and controlling the display interface of the first terminal to perform split-screen displaying, and the display interface of the first terminal including an interface for the current task being executed by the first terminal and an interface for a call process with the second terminal.

In an exemplary embodiment, the method further includes: detecting, by the first terminal, whether a user instruction is received within a preset first time range; and receiving and sending, by the first terminal, a voice message of the second terminal to the third terminal when no user instruction is received within the preset first time range or a third instruction is received within the preset first time range; wherein the third instruction is used to instruct to reject the call with the second terminal.

The present disclosure also provides a call terminal, including a call control unit and a transfer control unit, wherein the call control unit is configured to receive or initiate a call request to establish a call with a second terminal; and the transfer control unit is configured to detect at least one of the following: a current task being executed by the call terminal, whether there is one or more third terminals capable of assisting in the call, and a current task being executed by a third terminal; and select whether a display interface of the call terminal displays a call assisting option according to the current task being executed by the call terminal and/or the current task being executed by the third terminal, wherein the call assisting option is used to prompt a user to select to answer the call with the second terminal through the assistance of the third terminal.

The present disclosure also provides a call terminal, including a processor, a memory and a communication bus; wherein the communication bus is configured to implement connection and communication between the processor and the memory; and the processor is configured to execute one or more programs stored in the memory to implement the steps of any one call method described above.

The present disclosure also provides a non-transitory computer-readable storage medium, storing one or more programs capable of being executed by one or more processors to implement the steps of any one call method described above.

Other aspects will become apparent upon reading and understanding the drawings and the detailed description.

BRIEF DESCRIPTION OF DRAWINGS

The drawings are used to provide further understanding of the technical solutions of the present disclosure, constitute a part of the specification, and together with the embodiments of the present disclosure, are used to explain the technical solutions of the present disclosure but not to form limitation to the technical solutions of the present disclosure. The shapes and sizes of various components in the drawings do not reflect the true scale, and are only intended to schematically illustrate the contents of the present disclosure.

DETAILED DESCRIPTION

In order to make the objectives, technical solutions and advantages of the present disclosure clearer, embodiments of the present disclosure will be described in detail below in combination with the drawings. It is to be noted that implementations may be implemented in various forms. Those of ordinary skill in the art may easily understand such a fact that modes and contents may be transformed into various forms without departing from the objective and scope of the present disclosure. Therefore, the present disclosure should not be interpreted as being limited to the contents recorded in the following implementations only. The embodiments in the present disclosure and the features in the embodiments may be freely combined if there is no conflict.

Ordinal numerals such as "first", "second" and "third" in the present disclosure are set to avoid confusion of constituents, but not intended for restriction in quantity.

In the following description, suffixes such as "module", "component" or "unit" for representing elements are used only to facilitate the description of the present disclosure and do not have specific meanings. Therefore, "module", "component" and "unit" may be mixed in use.

Figure 1:
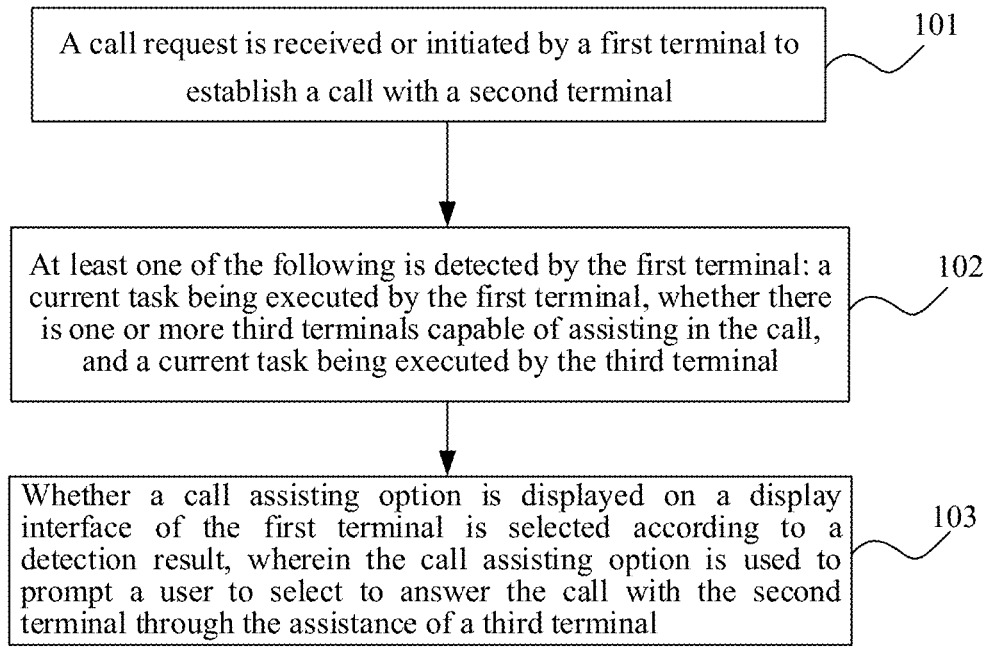
FIG. 1 is a schematic flowchart of a call method according to an embodiment of the present disclosure.

FIG. 1 is a schematic flowchart of a call method according to an embodiment of the present disclosure. As shown in FIG. 1, the call method includes acts 101-103.

In act 101, a call request is received or initiated by a first terminal to establish a call with a second terminal.

In act 102, at least one of the following is detected by the first terminal: a current task being executed by the first terminal, whether there is one or more third terminals capable of assisting in the call, and a current task being executed by the third terminal.

In act 103, whether a call assisting option is displayed on a display interface of the first terminal is selected according to a detection result, wherein the call assisting option is used to prompt a user to select to answer the call with the second terminal through the assistance of a third terminal.

The call in the embodiment of the present disclosure may refer to a call transmitted through a traditional telephone network of a telecommunication operator (referred to as, for example, a basic call in the embodiment of the present disclosure), or a Voice over Internet Protocol (VoIP) call transmitted via the Internet.

Exemplarily, the VoIP call may be a voice call, or a video call, etc., by utilizing a web chat tool. The web chat tool may be an application installed in an electronic device such as a mobile phone. For example, it may be an embedded application (i.e., a system application of the mobile phone) or a downloadable application. The embedded application is an application program provided as a part of implementation of the mobile phone. The downloadable application is an application program that may provide its Internet protocol Multimedia Subsystem (IMS) connection. The downloadable application may be an application pre-installed in the mobile phone or a third party application, such as WeChat, that can be downloaded and installed in the mobile phone by the user. The user makes a voice call or a video call with another user by utilizing the above-mentioned embedded application or downloadable application.

Figure 2:
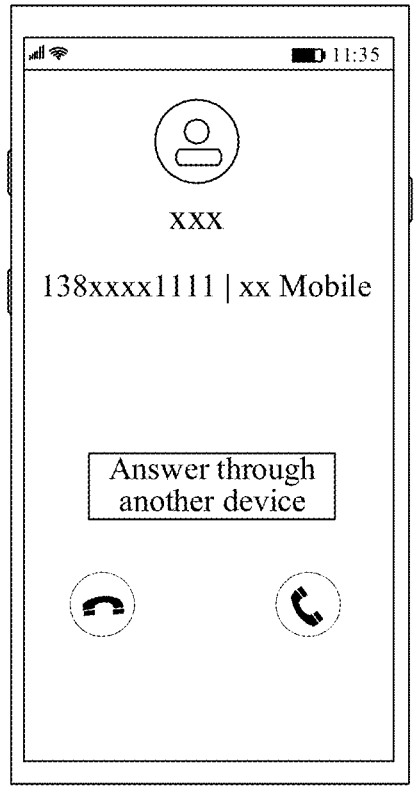
FIG. 2 is a schematic diagram of an incoming call prompting interface according to an embodiment of the present disclosure.
Figure 3:
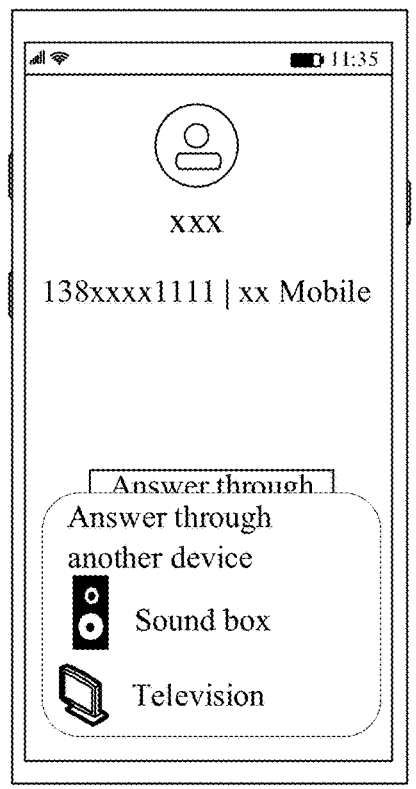
FIG. 3 is a schematic diagram of a call assisting terminal selection interface after answer through another device is selected in FIG. 2.
Figure 4:
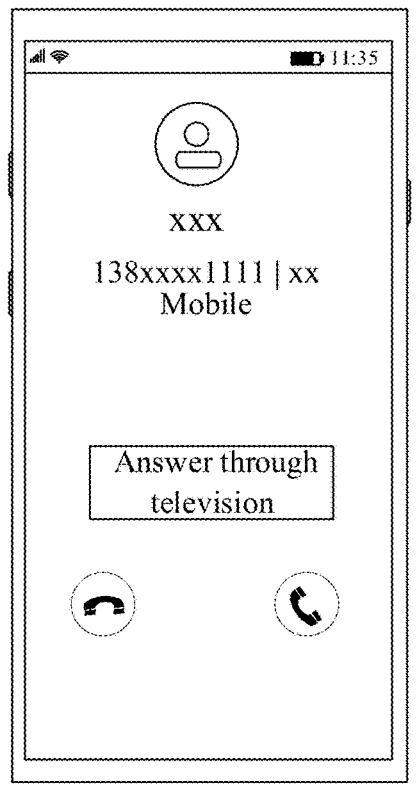
FIG. 4 is a schematic diagram of another incoming call prompting interface according to an embodiment of the present disclosure.
Figure 5:
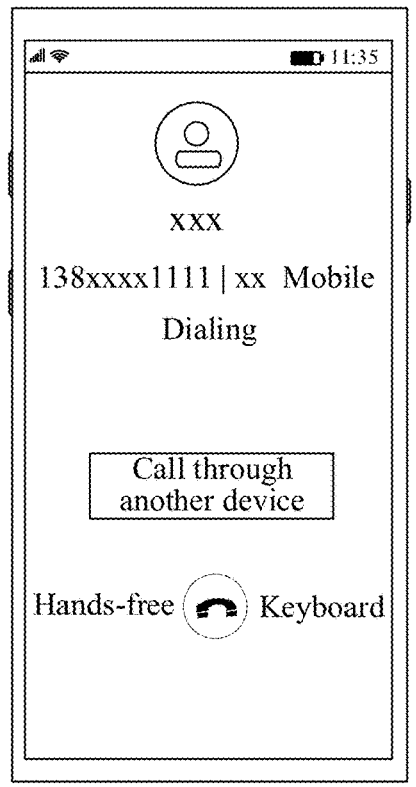
FIG. 5 is a schematic diagram of a dialing interface according to an embodiment of the present disclosure.
Figure 6:
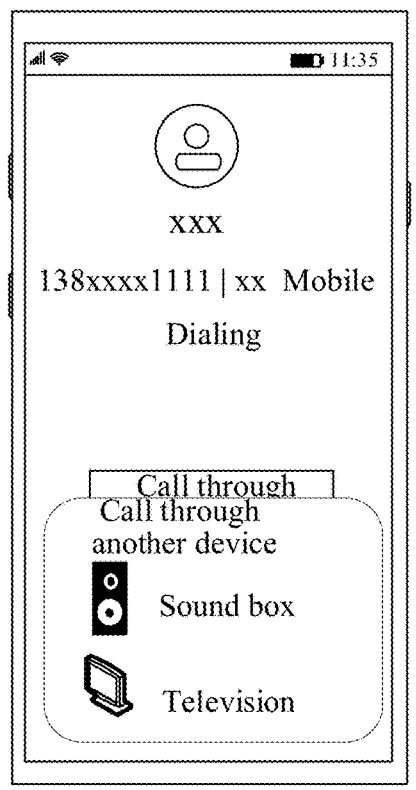
FIG. 6 is a schematic diagram of a call assisting terminal selection interface after call through another device is selected in FIG. 5.
Figure 7:
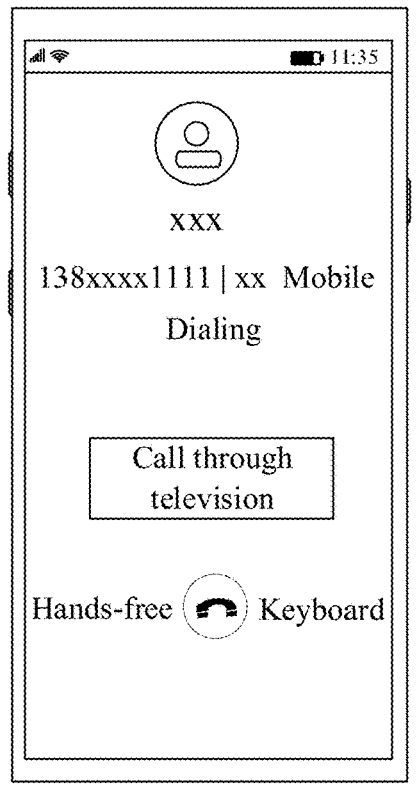
FIG. 7 is a schematic diagram of another dialing interface according to an embodiment of the present disclosure.
Figure 8:
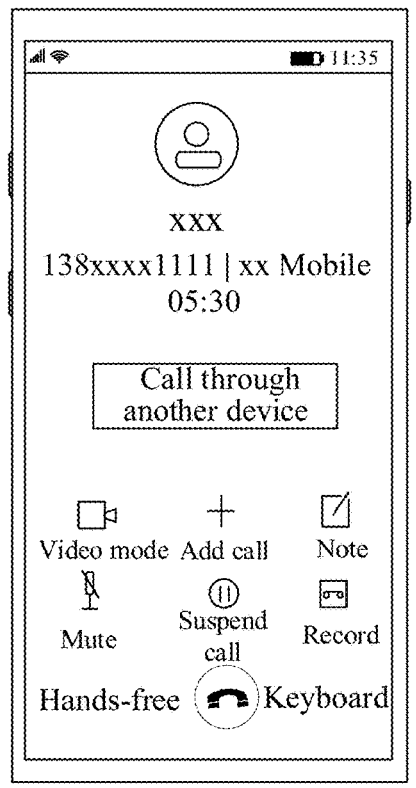
FIG. 8 is a schematic diagram of a call process interface according to an embodiment of the present disclosure.
Figure 9:
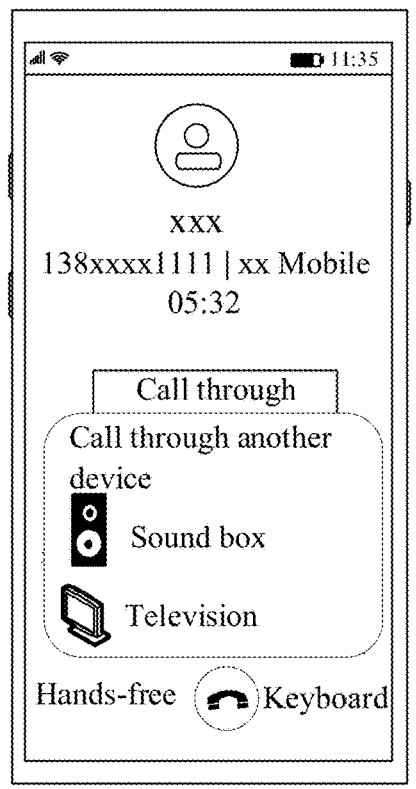
FIG. 9 is a schematic diagram of a call assisting terminal selection interface after call through another device is selected in FIG. 8.
Figure 10:
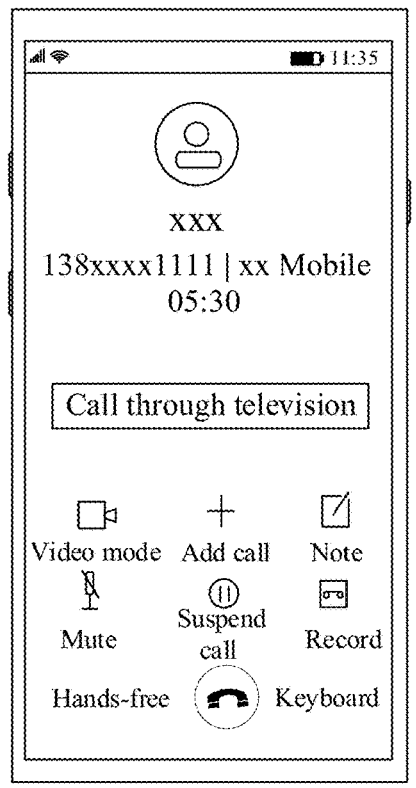
FIG. 10 is a schematic diagram of another call process interface according to an embodiment of the present disclosure.

In an exemplary implementation, the first terminal may implement the call with the second terminal as a side of the call. The third terminal may be a device capable of assisting in the call. When the user does not want, or it is inconvenient for the user, to use the first terminal to carry out the call with the user of the second terminal, the third terminal may be selected to carry out the call with the user of the second terminal. That is, the call of the first terminal may be transferred to the third terminal. The call method provided in the embodiment of the present disclosure may be executed during the establishment of the call between the first terminal and the second terminal (i.e., before the call between the first terminal and the second terminal is put through, e.g., when the second terminal calls the first terminal and the call is not put through, as shown in FIGS. 2 to 4, or when the first terminal calls the second terminal and the call is not put through, as shown in FIGS. 5 to 7), or may be executed after the establishment of the call between the first terminal and the second terminal (i.e., after the call between the first terminal and the second terminal is put through, e.g., after the first terminal calls the second terminal and the call is put through, or after the second terminal calls the first terminal and the call is put through, as shown in FIGS. 8 to 10).

The terminals (including the first terminal, the second terminal and the third terminal) described in the present disclosure may include a mobile terminal such as a mobile phone, a smart phone, a notebook computer, a digital broadcast receiver, a Personal Digital Assistant (PDA), a tablet computer (PAD), a Portable Multimedia Player (PMP), or a navigator, and a fixed terminal such as a digital Television (TV) or a desktop computer.

In an exemplary application scenario, the first terminal and the second terminal may be mobile terminals such as a mobile phone or a tablet computer. The third terminal may be a fixed terminal such as a television, a computer, or a sound box. When it is inconvenient for the user to answer a call through a mobile phone at home, for example, the user receives a call when playing a game with the mobile phone and the user does not want to delay for answering the call, if call information of the mobile phone is transferred to a device such as a television, a computer, or a sound box and the call is answered through the assistance of the device, the user may conveniently carry out the call through the third terminal when it is inconvenient for the user to answer the call through a speaker, microphone or display screen of the mobile phone. Of course, those skilled in the art may understand that the application scenario of the present disclosure is not limited to the above.

In an exemplary implementation, the first terminal and the third terminal may be connected through a wireless network (including Wireless Fidelity (WiFi), Bluetooth, infrared, or Zigbee, etc.), or send information to each other through a cloud server.

Exemplarily, taking WiFi connection as an example, when the first terminal receives a call, whether one or more third terminals are connected with the first terminal through WiFi is detected. If it is detected that a mobile phone 1 has been connected with a television, a call may be answered through the television according to a selection of the user or a presetting. If it is detected that no third terminal is connected with the first terminal through WiFi, whether the first terminal has turned on WiFi is detected. If the first terminal has not turned on WiFi, the first terminal turns on WiFi, and the first terminal searches for a nearby available device to establish a connection.

In an exemplary implementation, the first terminal may establish a connection with the third terminal before the call.

In an exemplary application scenario, the first terminal (e.g., the mobile phone 1) and the third terminal (e.g., the television at home) are connected with the same WiFi after the user gets home. If the mobile phone 1 is positioned at home, it indicates that the user is at home. When the user gets home and opens the door by fingerprint unlocking, a door lock sends identity information of the user to the television, and then the television is aware that the user is already at home, and automatically controls the television to establish a connection with the mobile phone 1.

When the mobile phone 1 receives a call, an incoming call prompting interface is displayed on a screen of the mobile phone 1. Multiple options are displayed on the incoming call prompting interface, and the multiple options are used for the user to select whether to answer the call and how to answer the call. When there are multiple third terminals that can be used for call transfer at home, the mobile phone 1 acquires information of the multiple third terminals, and the multiple third terminals are displayed on the mobile phone 1 for the user to select a third terminal to assist in a call when the call is received. For example, the user clicks one of the multiple third terminals to answer the call, such as a television in a living room or a television in a bedroom. The mobile phone 1 may acquire the information from the multiple third terminals connected therewith respectively. Alternatively, there is a third terminal serving as a center of smart home at home. For example, a television in the living room serves as the center. The television in the living room acquires state information of other third terminals at home and sends state information of the television and the other third terminals to the mobile phone 1. The mobile phone 1 acquires the information of the multiple third terminals.

In an exemplary implementation, the act 103 includes: controlling a screen of the first terminal to display a first interface when the current task being executed by the first terminal is a first-level task, the first interface including an answer option, a reject option and a call assisting option; and controlling the screen of the first terminal to display a second interface when the current task being executed by the first terminal is a second-level task, the second interface including an answer option and a reject option, without a call assisting option. Herein, a priority of the first-level task is higher than that of the second-level task. The first terminal includes any one or more of the following components: a microphone, a speaker, and a display screen.

Still taking the above-mentioned application scenario as an example, when it is detected that the mobile phone 1 displays an interface such as a game interface, a video interface, or a text edition interface, it is determined that a current task being executed by the mobile phone 1 is a first-level task, and it is inconvenient for the user to answer the call normally through the mobile phone 1. Then a call assisting option pops up on the incoming call prompting interface of the mobile phone 1. The call assisting option is used to prompt the user to select to answer the call with the second terminal through the assistance of a third terminal.

When it is detected that the mobile phone 1 displays a web browsing interface or is in a standby state, it is determined that a current task being executed by the mobile phone 1 is a second-level task, and answering the call through the mobile phone 1 does not matter. Then the above-mentioned call assisting option may be not displayed on the incoming call prompting interface of the mobile phone 1.

In an exemplary embodiment, a "more" option or a call assisting icon may be displayed on the incoming call prompting interface of the first terminal when the current task being executed by the first terminal is a second-level task.

Therefore, still taking the above-mentioned application scenario as an example, a "more" option or a call assisting icon may be displayed on the incoming call prompting interface of the mobile phone 1 when it is detected that the mobile phone 1 displays a web browsing interface or is in a standby state. When the user wants to use a television to assist in the call, the user may invoke an option of using the television to assist in the call by touching the "more" option or the call assisting icon or operating over the air, to control the television to assist in the call.

In an exemplary implementation, the act 103 includes: controlling a screen of the first terminal to display a first interface when the current task being executed by the third terminal is a third-level task, the first interface including an answer option, a reject option and a call assisting option; and controlling the screen of the first terminal to display a second interface when the current task being executed by the third terminal is a fourth-level task, the second interface including an answer option and a reject option, without a call assisting option. Herein, a priority of the fourth-level task is higher than that of the third-level task, and the third terminal includes any one or more of the following components: a microphone, a speaker, and a display screen.

In an exemplary implementation, the method further includes: displaying state information of each third terminal on the display interface of the first terminal.

Figure 11:
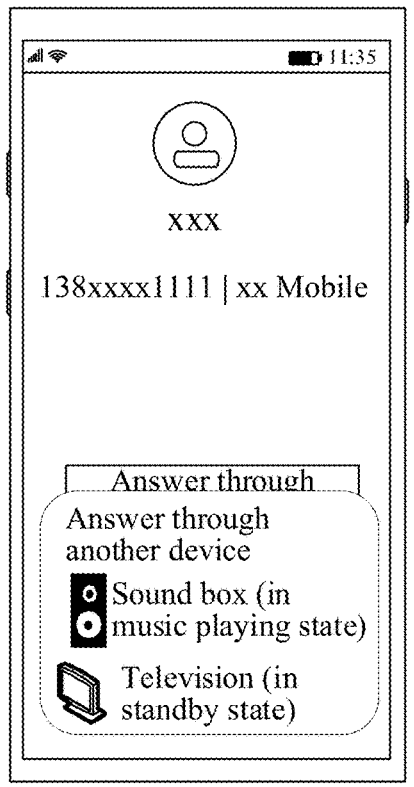
FIGS. 11 to 13 are schematic diagrams of three call assisting terminal selection interfaces according to embodiments of the present disclosure.

Still taking the above-mentioned application scenario as an example, the mobile phone 1 acquires a state of each third terminal connected with the mobile phone 1 when receiving a call or in real time. The mobile phone 1 may send state query information to each third terminal (e.g., the television). The television sends state feedback information to the mobile phone 1. The state of each third terminal, such as in use, not in use, or playing a video currently, may be displayed on the display interface of the mobile phone 1 for the user to select which third terminal to use for the transfer, as shown in FIG. 11. Alternatively, the mobile phone 1 may send an instruction for acquiring a current task level to the television. The television sends current task level information to the mobile phone 1. The mobile phone 1 determines whether the television can be used for the transfer of a call received by the mobile phone 1 according to the current task level of the television.

When it is detected that the television is currently using a function such as video call or video playing, it is determined that a current task being executed by the television is a fourth-level task, and it is predicted that the television cannot be used for transfer of a call received by the mobile phone 1. Then an option of answering through the television is not displayed when the mobile phone 1 receives a call.

When it is detected that the television is currently displaying a page such as a browsing page or a standby page, it is determined that a current task being executed by the television is a third-level task, and a call assisting option is displayed on the mobile phone 1. If the user wants to answer the call through the television, the user may invoke the option of answering through the television by a touch or an operation over the air, to control the television to assist in the call.

In an exemplary implementation, when the first terminal detects that there is one or more third terminals capable of assisting in the call, an answer option, a reject option and a call assisting option are displayed on the incoming call prompting interface of the first terminal, or, a hang up option and a call assisting option are displayed on a dialing interface or a call process interface of the first terminal.

Still taking the above-mentioned application scenario as an example, as shown in FIGS. 2 to 4, when the mobile phone 1 receives a call, an incoming call prompting interface for the call from the second terminal (e.g., a mobile phone 2) may be displayed on the mobile phone 1. Multiple option buttons such as "answer", "reject" and "answer through XX device" may be displayed on the incoming call prompting interface. The user may click the above-mentioned multiple option buttons on the mobile phone 1. As shown in FIGS. 5 to 10, a dialing interface or a call process interface may be displayed on the mobile phone 1 during dialing or a call process of the mobile phone 1. Multiple option buttons such as "hang up" and "call through XX device" may be displayed on the dialing interface or the call process interface. The user may click the above-mentioned multiple option buttons on the mobile phone 1.

Exemplarily, the mobile phone 1 detects that there is a third terminal (e.g., a television) capable of assisting in the call. As shown in FIG. 4, when the mobile phone 1 receives a call, options "answer", "reject" and "answer through television" are displayed on the incoming call prompting interface of the mobile phone 1. As shown in FIGS. 7 and 10, options "hang up" and "call through television" are displayed on a dialing interface or a call process interface of the mobile phone 1 during dialing or a call process of the mobile phone 1.

In an exemplary embodiment, when the mobile phone 1 detects that there are two or more third terminals (e.g., a sound box and a television) that can be used for the transfer of the call, the option button "answer through XX device" may be displayed as "answer through another device", as shown in FIG. 2. When the user clicks the option button, the mobile phone 1 may display a call assisting terminal selection interface on the incoming call prompting interface, as shown in FIG. 3, the call assisting terminal selection interface including a first button for transferring the call to the sound box and a second button for transferring the call to the television. Alternatively, the option button "call through XX device" may be displayed as "call through another device", as shown in FIGS. 5 and 8. When the user clicks the option button, the mobile phone 1 may display a call assisting terminal selection interface on the dialing interface or the call process interface, and the call assisting terminal selection interface is used for selecting one or more third terminals for assisting in the call. In the embodiment, as shown in FIGS. 6 and 9, the call assisting terminal selection interface includes a first button for transferring the call to the sound box and a second button for transferring the to the television.

In another exemplary embodiment, when the mobile phone 1 detects that there are two or more third terminals (e.g., a sound box and a television) that can be used for the transfer of the call, a corresponding number of option buttons may be directly displayed on the incoming call prompting interface, the dialing interface or the call process interface, for transferring the call to a corresponding third terminal. For example, the mobile phone 1 detects that the sound box and the television can be used for the transfer of the call. Then an option button (e.g., an option button including the expression "answer through sound box") may be directly displayed on the incoming call prompting interface, the dialing interface or the call process interface, for transferring the call to the sound box to proceed, and another option button (e.g., an option button including the expression "answer through television") may be displayed on the incoming call prompting interface, the dialing interface or the call process interface to transfer the call to the television to proceed.

In an exemplary implementation, when there are multiple third terminals, the method further includes: acquiring, by the first terminal, historical use frequency information of the multiple third terminals, and determining a display sequence of the multiple third terminals on the display interface (the display interface may be a call assisting terminal selection interface popping up after the user clicks the option "answer through XX device" or "call through XX device", e.g., a selection window of the incoming call prompting interface, the dialing interface or the call process interface, or may be the incoming call prompting interface, the dialing interface, or the call process interface) according to the historical use frequency information of the multiple third terminals.

In the embodiment, in combination with a historical usage of the user, a display sequence of the multiple third terminals on the display interface is determined. The third terminals are sequenced according to the historical use frequency information, and a third terminal with a high historical use frequency is recommended preferentially for the user to select.

In an exemplary implementation, when the current task being executed by the third terminal is a fourth-level task, the method further includes: sending, by the first terminal, a call transfer request to the third terminal, and determining whether to answer the call with the second terminal through the assistance of the third terminal according to a call transfer response of the third terminal.

Still taking the above-mentioned application scenario as an example, when it is detected that the television is currently displaying a page such as a browsing page or a standby page, it is determined that the current task being executed by the television is a third-level task. Then a call transfer request is not needed to be sent, and an option of answering/calling through the television may be directly displayed on the mobile phone 1. If the user wants to answer/call through the television, the user may invoke the option of answering/calling through the television by a touch or an operation over the air, to control the transfer to the television, and a transfer operation is directly started on the television without a query window popping up on the television.

When it is detected that the television is currently using a function such as video call or video playing, it is determined that the current task being executed by the television is a fourth-level task, and the mobile phone 1 may send a call transfer request to the television and confirm whether to transfer the call according to a voice reply or a selection of the user of the television. Exemplarily, the mobile phone 1 sends a call transfer request to the television, and "Whether to answer a call from mobile phone 2" is displayed on the television. The call is automatically answered through the television if the user selects "YES" or no feedback is received within a preset time length (e.g., 10 s). If the user selects "NO", answering through the television is not initiated, and "the television refuses to answer the call" is prompted on the mobile phone, and then options "answer" and "answer through another device" are displayed.

In an exemplary implementation, when there are multiple third terminals, the method further includes: acquiring, by the first terminal, position information of the multiple third terminals, and determining a display sequence of multiple call assisting options corresponding to the multiple third terminals on the display interface of the first terminal according to the position information of the multiple third terminals. Herein, the multiple third terminals correspond to the multiple call assisting options one to one.

Figure 12:
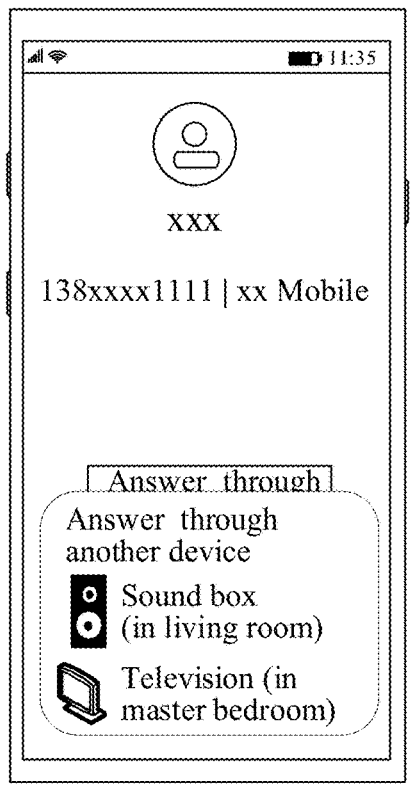

Still taking the above-mentioned application scenario as an example, as shown in FIG. 12, the mobile phone 1 acquires the rooms where the multiple third terminals are located. For example, the multiple third terminals acquired by the mobile phone 1 include a sound box in the living room and a television in the master bedroom. Multiple call assisting options corresponding to the multiple third terminals (and the rooms where they are located) are displayed on the display interface. The user may select the sound box in the living room as a terminal to assist in the call.

In an exemplary embodiment, the mobile phone 1 may determine a room where the mobile phone 1 is located through an indoor positioning technology, and a third terminal in the room where the mobile phone 1 is located or a third terminal in a room closest to the room where the mobile phone 1 is located is preferentially displayed on the display interface.

In an exemplary implementation, when there are multiple third terminals, the method further includes: acquiring, by the first terminal, distance information of the multiple third terminals from the first terminal, and determining a display sequence of multiple call assisting options corresponding to the multiple third terminals on the display interface of the first terminal according to the distance information of the multiple third terminals from the first terminal. Herein, the multiple third terminals correspond to the multiple call assisting options one to one.

Figure 13:
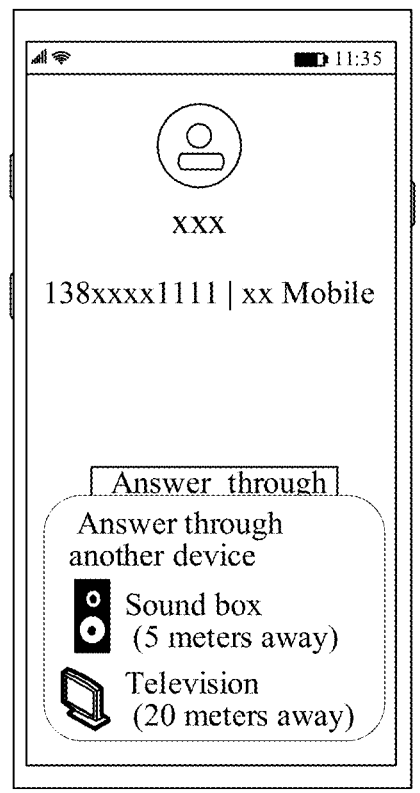

Still taking the above-mentioned application scenario as an example, as shown in FIG. 13, the user acquires distance information of the multiple third terminals from the mobile phone 1, and a display sequence of multiple call assisting options corresponding to the multiple third terminals on the display interface of the mobile phone 1 is controlled according to the distances. Call assisting options corresponding to one or more third terminals with shortest distances may be displayed and sequenced according to the distances such that the user may select a nearby third terminal to assist in answering.

In an exemplary implementation, the method further includes beforehand: setting, by the first terminal, an automatic answering mode or an incoming call voice-prompting mode. Herein, the automatic answering mode is used to automatically send an incoming call to a third terminal to be answered under assistance. The incoming call voice-prompting mode is used to prompt the user of information of an incoming call through a voice.

Exemplarily, after the "incoming call voice-prompting" mode is set in the mobile phone 1, when the mobile phone 1 receives a call, information of the incoming call is not displayed on the screen of the mobile phone 1, the user is prompted of the incoming call through a voice only, and the mobile phone 1 is controlled to answer the call or the call is answered through the assistance of the television according to a voice instruction of the user, such as "answer" or "answer through television". After the user sets the "automatically answering through television mode" before playing a game, when the mobile phone 1 receives a call, the incoming call may be automatically sent to the television to be answered under assistance.

The call method of the embodiment of the present disclosure enables a user to optionally answer a call by utilizing hardware of a television such as a speaker, a microphone or a display screen when hardware of a mobile phone 1 such as a speaker, a display screen and a microphone is occupied when the user plays a game or uses another application program. The cooperation of software and hardware for implementing the transfer is achieved in the following several ways. The user may set in advance, or a system determines automatically, which way to select.

Figure 14:
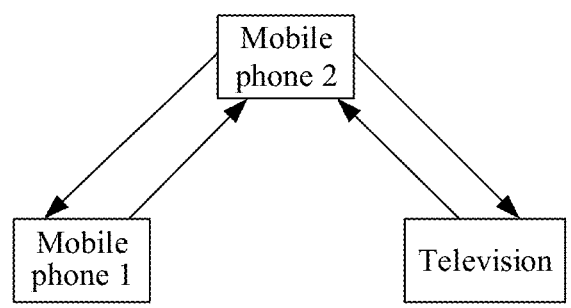
FIG. 14 is a schematic diagram of an application scenario of the call method according to an embodiment of the present disclosure.

As shown in FIG. 14, in the call method of the embodiment of the present disclosure, a communication connection with an external mobile phone 2 (i.e., the second terminal) may be established by a mobile phone 1 (i.e., the first terminal), or a communication connection with an external mobile phone 2 (i.e., the second terminal) may be established by a television (i.e., the third terminal).

In an exemplary implementation, the method further includes: receiving, by the first terminal, a first instruction, the first instruction being used to request answering the call with the second terminal through the assistance of the third terminal. The call is implemented among the first terminal, the second terminal and the third terminal in any one of the following ways: collecting and sending, by the first terminal, first voice data to the third terminal for the third terminal to transmit the first voice data to the second terminal, and receiving and playing, by the third terminal, second voice data transmitted by the second terminal; collecting and transmitting, by the third terminal, first voice data to the second terminal, and receiving and playing, by the third terminal, second voice data transmitted by the second terminal; collecting and transmitting, by the third terminal, first voice data to the second terminal, receiving and sending, by the third terminal, second voice data transmitted by the second terminal to the first terminal, and playing, by the first terminal, the second voice data; or collecting and sending, by the first terminal, first voice data to the third terminal for the third terminal to transmit the first voice data to the second terminal, receiving and sending, by the third terminal, second voice data transmitted by the second terminal to the first terminal, and playing, by the first terminal, the second voice data.

In an exemplary implementation, the first terminal determines one or more of the first terminal and/or the third terminal as voice collection terminals (i.e., determining that one or more of the first terminal and/or the third terminal collect the first voice data) according to any one or more of the following ways: according to whether a microphone of the first terminal is occupied by another application program; according to a quality of voice collected by the microphone of the first terminal and/or a quality of voice collected by a microphone of the third terminal; or according to a distance between the user and the first terminal and a distance between the user and the third terminal.

In an exemplary implementation, the first terminal determines the first terminal or the third terminal as a voice playing terminal according to any one or more of the following ways: according to whether a speaker of the first terminal is occupied by another application program; or according to whether the first terminal or the third terminal is connected with an earphone.

Figure 15:
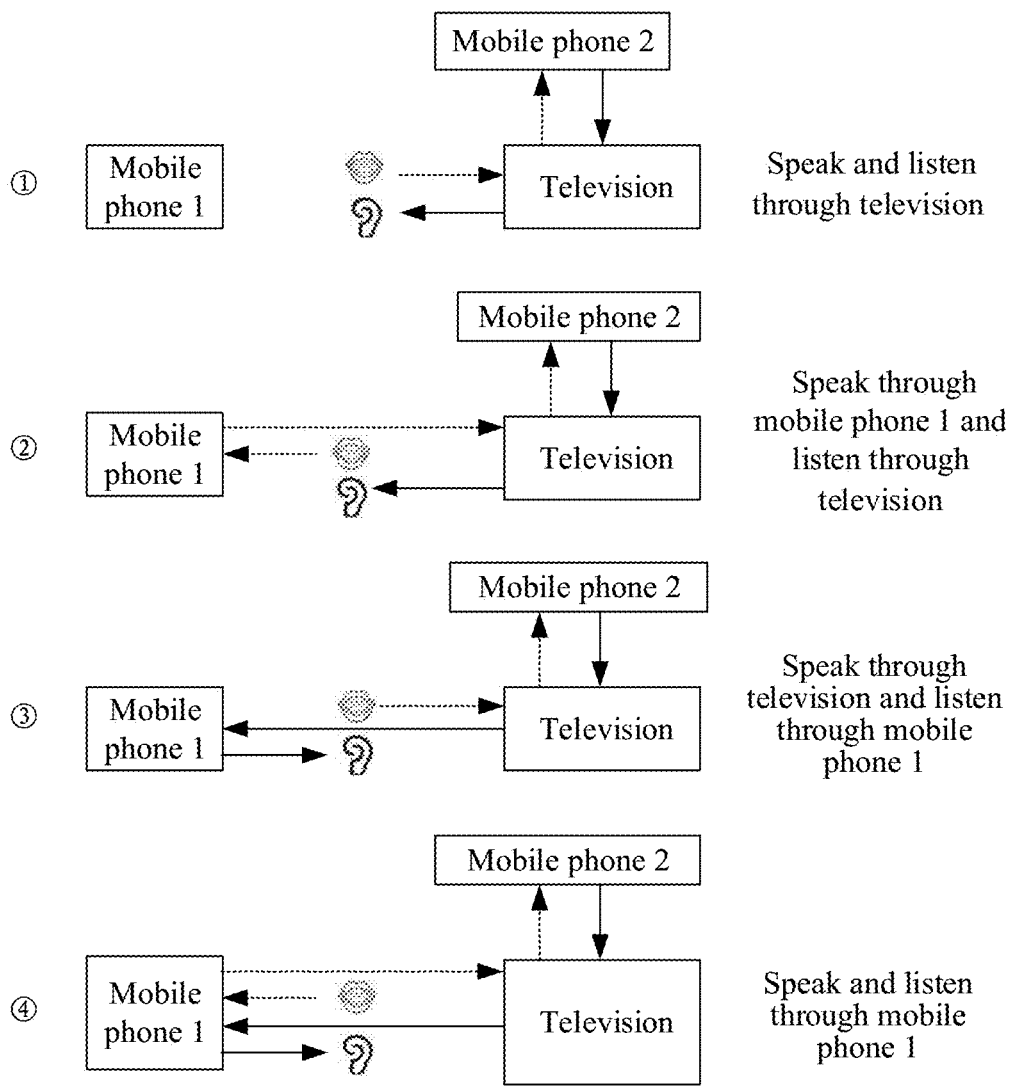
FIG. 15 is a schematic diagram of data flow directions in some scenarios of the call method according to embodiments of the present disclosure.

Still taking the above-mentioned application scenario as an example, the call is answered through the television, and the television directly performs data communication with the mobile phone 2. Taking a VoIP call as an example, the mobile phone 1 sends a control signal to a cloud or the television, to control the mobile phone 1 and the television to log in with the same account, and control the television to open a corresponding call APP, and the television establishes a communication data transmission channel with the opposite side (the mobile phone 2) directly. Different hardware of the television may be turned on for different types of calls. For a voice call, the television may be in an off or standby state, and a function of making the call through the television may be realized by turning on the speaker and microphone of the television only, without turning on the display screen. For a video call, a camera and the screen of the television also need to be turned on. As shown in FIG. 15, the following four implementation ways may be selected.

(1) Speak and listen through the television: the television acquires a voice of the user of the television and a voice of the user of the mobile phone 2.

In the call process, the television establishes communication with the mobile phone 2. The microphone of the television acquires and sends the voice of the user of the television to the mobile phone 2. The television acquires the voice of the opposite side (the user of the mobile phone 2), and the voice of the opposite side is played through the speaker of the television. Both the mobile phone 1 and the television may control the call. The call is implemented through the hardware of the television, the hardware of the mobile phone 1 is not occupied, and the original game playing and microphone use of the mobile phone 1 can be continued.

(2) Speak through the mobile phone 1 and listen through the television: the mobile phone 1 acquires and sends a voice of the user of the mobile phone 1 to the television, and the television acquires and directly plays a voice of the user of the mobile phone 2.

In the call process, the television establishes communication with the mobile phone 2. The user speaks to the microphone of the mobile phone 1. The mobile phone 1 acquires and sends the voice of the user to the television for the television to send the voice to the mobile phone 2. The television acquires the voice of the opposite side and plays the voice through the speaker of the television. When the user is close to the mobile phone 1, acquiring the voice of the user through the microphone of the mobile phone 1 may achieve a better call voice effect, and the user does not need to get close to the television to make the call, which brings more convenience in use.

The specific way to be selected may be determined according to one or more conditions, and examples are given below.

It is detected whether the speaker of the mobile phone 1 is in use before the call is received. If the speaker of the mobile phone is in use and the user wants to continue using the speaker of the mobile phone 1, the voice of the opposite side may be played through the speaker of the television. After the call is answered, the sound amplitude of the speaker of the mobile phone is automatically turned down so as to avoid influences on the call.

A distance between the user and the mobile phone or the television is detected, and the one with a shorter distance is selected as a voice collection terminal. Optionally, whether the user is using the mobile phone is detected first. If a touch operation is detected, it indicates that the user is using the mobile phone 1, and the voice of the user may be acquired through the mobile phone.

It is determined according to call quality. For example, if it is detected by voice recognition that the opposite side says he/she cannot hear clearly, or a volume of a collected voice signal is detected and a volume of voice collected by the microphone of the mobile phone is lower than a threshold, voice collection can be switched to be performed by the microphone of the television. Alternatively, the microphones of the mobile phone and the television are turned on at the same time, and qualities of collected voice are compared. For example, it is detected whether a volume of collected voice exceeds a certain threshold or which voice is louder. The way with a higher call quality is selected as an ultimate way of collection. If it is detected that both are lower than the threshold, the microphones of the mobile phone and the television may be turned on at the same time to acquire the voice of the user, and the two parts of the voice are synthesized by voice processing to implement voice signal enhancement.

(3) Speak through the television and listen through the mobile phone 1.

The specific way to be selected may be determined according to one or more conditions, and examples are given below.

It is detected whether the microphone of the mobile phone 1 is in use before the call is received. If the microphone is in use and the user wants to continue using the microphone of the mobile phone 1, the voice of the user may be collected through the microphone of the television.

If it is detected that the user is wearing an earphone when using the mobile phone 1, the voice of the mobile phone 2 is played through the mobile phone 1 so as to avoid the situation that the user cannot hear clearly if the voice is played by the television. In some exemplary embodiments, as long as it is detected that the user wears an earphone, which terminal is connected with the earphone is identified, and the voice of the opposite side in the call is received through the identified terminal.

(4) Speak and listen through the mobile phone 1: if it is detected that a communication signal of the television is better than that of the mobile phone 1, a communication connection is established with the mobile phone 2 directly by the television, the user directly speaks through the mobile phone 1, the voice is sent to the television, and the voice of the mobile phone 2 sent by the television is received and played.

In an exemplary implementation, the method further includes: receiving, by the first terminal, a first instruction, the first instruction being used to request answering the call with the second terminal through the assistance of the third terminal. The call is implemented among the first terminal, the second terminal and the third terminal in any one of the following ways: receiving and transmitting, by the first terminal, first voice data collected by the third terminal to the second terminal, and receiving and sending, by the first terminal, second voice data transmitted by the second terminal to the third terminal to be played by the third terminal; collecting and transmitting, by the first terminal, first voice data to the second terminal, and receiving and sending, by the first terminal, second voice data transmitted by the second terminal to the third terminal to be played by the third terminal; or receiving and transmitting, by the first terminal, first voice data collected by the third terminal to the second terminal, and receiving and playing, by the first terminal, second voice data transmitted by the second terminal.

Figure 16:
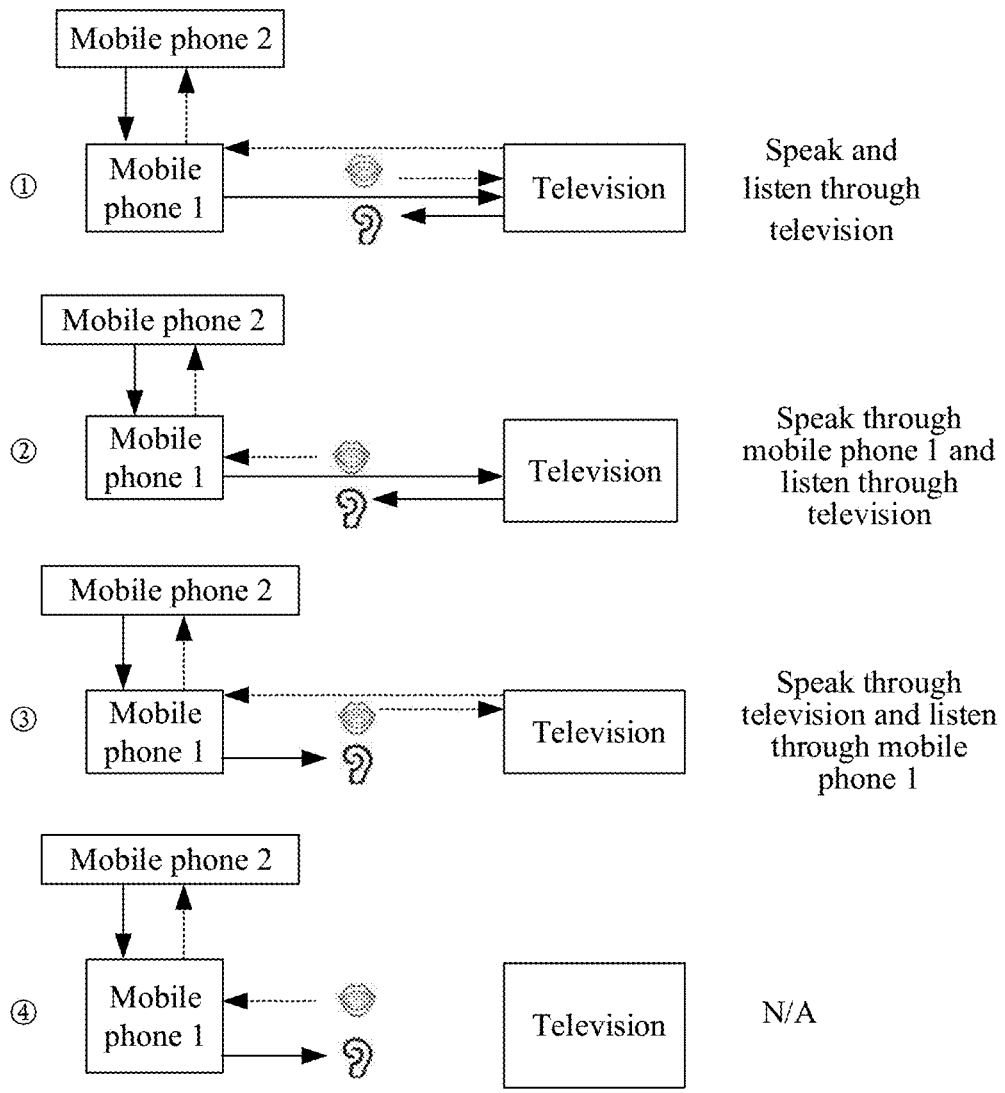
FIG. 16 is a schematic diagram of data flow directions in some other scenarios of the call method according to embodiments of the present disclosure.

Still taking the above-mentioned application scenario as an example, the call is answered through the television, but data communication with the mobile phone 2 is performed by the mobile phone 1. As shown in FIG. 16, the following three implementation ways may be selected.

(1) The microphone of the television acquires and transmits the voice of the user to the mobile phone 1 to be sent to the mobile phone 2. The speaker of the television plays the voice of the opposite side. If it is detected that the strength of a communication signal of the mobile phone 1 is higher than that of the television when the user selects to transfer the call to the television, a communication connection with the mobile phone 2 may be established by the mobile phone 1.

(2) In the call process, the microphone of the mobile phone 1 acquires the voice of the user. The speaker of the television plays the voice of the opposite side. The mobile phone 1 establishes a communication connection with the mobile phone 2. The mobile phone 1 receives and sends a voice signal of the user received directly through the microphone of the mobile phone 1 to the mobile phone 2. The mobile phone 1 receives and sends in real time the voice of the opposite side of the mobile phone 2 to the television to be played by the speaker of the television.

If the user wants to answer the call through the television but is far from the television, speaking to the microphone of the mobile phone has a better effect of voice collection than speaking through the microphone of the television. The sound of the speaker of the television is adjustable, so the voice of the opposite side is played by the speaker of the television to implement the call, the speaker of the mobile phone is not occupied for voice playing, the sound playing of an original game interface on the mobile phone is not affected and the user may continue playing with the mobile phone normally while answering the call. The volume of the voice of the opposite side played by the television may be adjusted through an interface or keys of the mobile phone. When sound adjustment is triggered on the mobile phone, the mobile phone sends a corresponding sound adjustment signal to the television so as to control the television to adjust the sound of the speaker.

(3) Data transmission is performed between the mobile phone 1 and the television. The mobile phone 1 sends a control signal to the television, so that the voice of the user is acquired through the microphone of the television and sent in real time to the mobile phone 1, and then sent by the mobile phone 1 to the mobile phone 2. The voice of the opposite side is played by the speaker of the mobile phone 1 after the mobile phone 1 acquires the voice of the opposite side from the mobile phone 2. It is applicable to such a scenario that the microphone of the mobile phone 1 is in use and thus the voice is acquired through the microphone of the television, or that the user is using an earphone when using the mobile phone 1.

In an exemplary implementation, in the process that the call with the second terminal is answered through the assistance of the third terminal, the method further includes any one of the following: controlling the screen of the first terminal to display a prompting icon indicating that the call is being answered through the third terminal; controlling the screen of the first terminal to display a prompting icon indicating that the call is being answered through the third terminal, and the prompting icon being highlighted or flickering; or controlling the screen of the first terminal to display call control options such as "answer through this terminal", "answer through another device" and "hang up".

Figure 17:
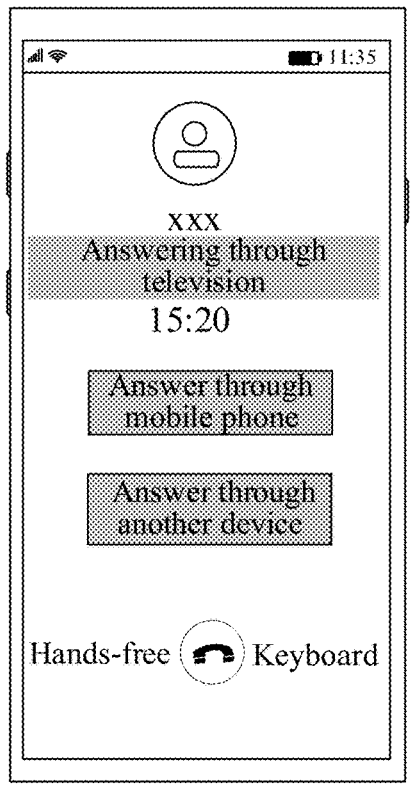
FIGS. 17 to 20 are schematic diagrams of four other call process interfaces according to embodiments of the present disclosure.

Still taking the above-mentioned application scenario as an example, after the mode of answering through the television is turned on, as shown in FIG. 17, an icon "answering through television" is displayed on the incoming call prompting interface of the mobile phone 1. The icon is highlighted, so as to prompt the user of a current state. Options such as "answer through mobile phone", "answer through another device" and "hang up" may also be displayed. After the call is answered through the television, which third terminals else are available may be continuously detected by the above-mentioned method, and the option of answering through another device is updated and displayed. For example, after it is detected that a computer is connected with the mobile phone, an option "answer through computer" is displayed. Switching may be performed if the user selects "answer through computer". The call answering is switched to the mobile phone if the user selects "answer through mobile phone".

In an exemplary implementation, in the process that the call with the second terminal is answered through the assistance of the third terminal, the method further includes: detecting, by the first terminal, a distance between the first terminal and the third terminal currently assisting in the call, and controlling the screen of the first terminal to display a switching prompting interface when the distance between the first terminal and the third terminal currently assisting in the call is greater than a first distance threshold, the switching prompting interface being used to prompt switching the third terminal in the call with the second terminal.

In an exemplary implementation, in the process that the call with the second terminal is answered through the assistance of the third terminal, the method further includes: detecting, by the first terminal and/or the third terminal, a quality of voice information in the current call process, the quality of voice information including at least one of a data delay, packet loss or jitter, and controlling a screen of the first terminal and/or the third terminal to display a switching prompting interface when the quality of voice information in the current call process is lower than a preset first quality threshold of voice information, wherein the switching prompting interface is used to prompt switching the third terminal in the call with the second terminal.

According to the call method of the embodiment of the present disclosure, the user may actively switch the third terminal in the call with the second terminal. Alternatively, the user is prompted to switch the third terminal in the call with the second terminal when it is detected that call quality is poor. Exemplarily, the user may be prompted to replace the answering terminal if it is detected that an answering effect is poor when the call is answered through the television. For example, when a position of the mobile phone changes, it is detected that the distance between the mobile phone and the television is too long and affects information transmission, then the television is unsuitable for answering the call, the system detects distances between the mobile phone and multiple terminals at home and prompts the user to switch to a nearby terminal for answering the call. Alternatively, the user may be prompted to switch to another terminal for answering the call when the call quality is poor, for example, the voice is intermittent or the volume is lower than a preset volume threshold. Alternatively, when the user moves, images may be captured by cameras in various rooms and sent to the television in the living room for face recognition to identify which room of the house the user is in, and then the call answering is automatically switched to a terminal in the room or the user is prompted to switch to the terminal in the room for answering the call.

In an exemplary implementation, in the process that the call with the second terminal is answered through the assistance of the third terminal, the method further includes: displaying a prompt "the call is being answered" on the third terminal, and controlling a use authority of the third terminal.

In an exemplary implementation, in the process that the call with the second terminal is answered through the assistance of the third terminal, the method further includes at least one of the following: receiving, by the first terminal, a type of the current task being executed by the third terminal, and when the current task being executed by the third terminal includes an executed task conflicting with the current call process, sending, by the first terminal, a notification of suspending the executed task conflicting with the current call process to the third terminal; or receiving, by the first terminal, a type of the current task being executed by the third terminal, and controlling the screen of the first terminal to display a privacy protection prompting interface when the current task being executed includes an executed task except the current call process, the privacy protection prompting interface being used to prompt the user to protect privacy.

Still taking the above-mentioned application scenario as an example, a use authority of the television in a call transfer process may be preset. In case of a voice call, if someone uses the television, an application without audio or sound collection on the television may be used, such as viewing photos or documents. Alternatively, when a video file on the television is opened, it is muted automatically and sound of the video is not played, so as to avoid interferences to the call.

Figure 18:
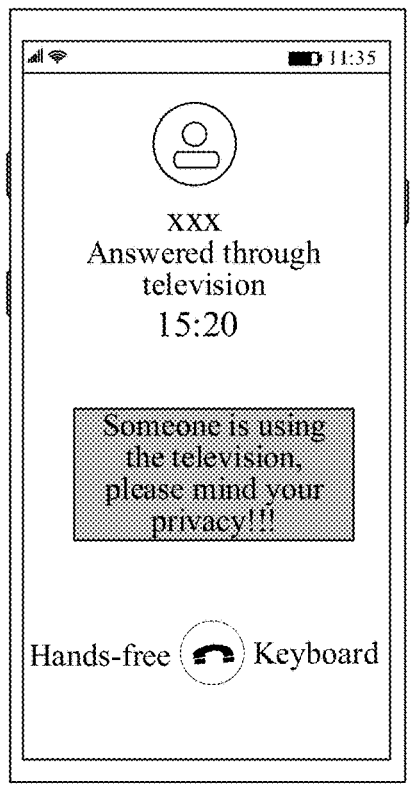

When another function of the television is turned on, a prompt may be sent to the mobile phone. (1) Authorities of functions of the television that can be used when the mode of answering through the television is turned on may be set on the mobile phone or the television. For example, an entry interface of the smart home and photos are allowed to be viewed, but no video is allowed to be opened. In the process that the call is answered through the television, the mobile phone may configure a use authority of the television. For example, if someone turns on a video function of the television, the television sends a notification to the mobile phone, and it is displayed on the mobile phone that someone is using the video function and a configuration option is displayed on the mobile phone. If the user selects to prohibit the use, a video interface on the television is exited, and a prompt is given on the television. (2) A prompt "someone is using the television, please mind your privacy" is displayed on the mobile phone, as shown in FIG. 18. The camera of the television is turned on to take a photo, and an identity of a current user is recognized by image analysis. If the identity is not included in a preset identity library, a prompt that a stranger is using the television is sent to the mobile phone. If the identity is included in the preset identity library, a prompt of the identity of the user may be sent to the mobile phone.

In an exemplary implementation, the method further includes: receiving, by the first terminal, a second instruction, the second instruction being used to instruct to answer the call with the second terminal through the first terminal; and controlling the screen of the first terminal to display a screen projection prompting interface, wherein the screen projection prompting interface is used to prompt whether the current task being executed by the first terminal needs to be pushed to the third terminal to be played.

Figure 19:
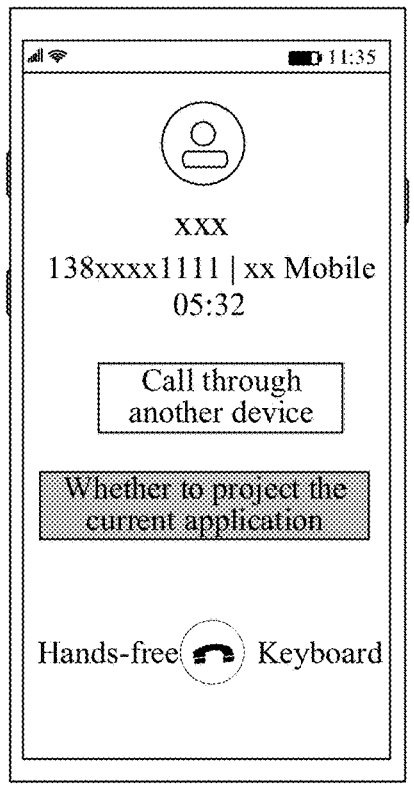

Still taking the above-mentioned application scenario as an example, after the mobile phone 1 receives a call and the call is answered through the mobile phone 1, a screen projection prompting interface is displayed on the screen of the mobile phone 1, as shown in FIG. 19. After an interface before the mobile phone 1 receives the call is projected to the television according to the selection of the user, a window or icon indicating that the interface has been projected to the television is displayed on the screen of the mobile phone 1. The mobile phone 1 may send a screen projection instruction to the cloud through a push mode, the instruction including a link of the game and an indication of taking the television as a screen projection display terminal. The cloud sends the link of the game to the television to display pictures of the game. The speaker and microphone of the mobile phone are kept on so as to implement the call. The user may play the game on the television and simultaneously answer the call through the mobile phone 1. Alternatively, the user presets that a screen projection mode is turned on after a call is answered, so that screen projection to the television is automatically implemented when a call is answered while playing a game.

After the user selects to project the game interface to the television during answering the call, options "cancel screen projection" and "screen projection to another terminal" are displayed on the interface of the mobile phone. If the user selects "cancel screen projection", a game interface played on the television before is displayed inside or outside an incoming call window on the interface of the mobile phone for the user to continue to view. Alternatively, a game interface icon is displayed, and after the user clicks the icon, the mobile phone switches to display the game interface. If the user selects "screen projection to computer", the game interface is switched to be displayed on the computer.

A "hang up" option is displayed in the incoming call window after the user answers the call. After the user hangs up the call, an option "whether to cancel screen projection" pops up on the mobile phone for the user to select whether to switch to play the game on the mobile phone. Alternatively, after the call is hung up, screen projection is automatically canceled, and the game interface continues to be played on the mobile phone.

In an exemplary implementation, the method further includes: receiving, by the first terminal, a second instruction, the second instruction being used to indicate to answer the call with the second terminal through the first terminal; and controlling the display interface of the first terminal to perform split-screen displaying, and the display interface of the first terminal including an interface for a current task being executed by the first terminal and an interface for a call process with the second terminal.

Figure 20:
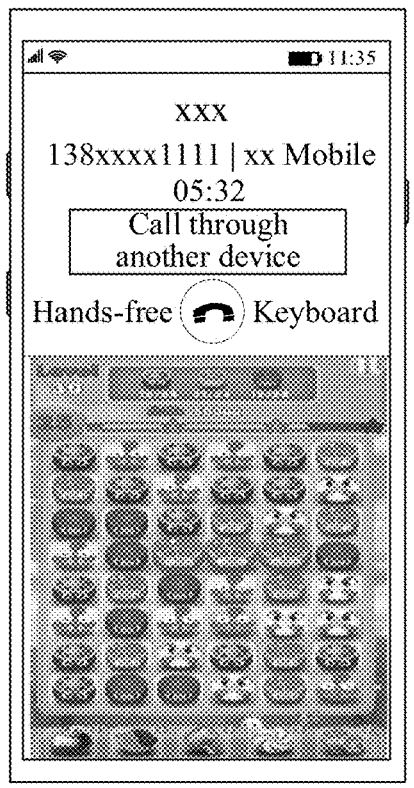

Still taking the above-mentioned application scenario as an example, as shown in FIG. 20, after the mobile phone 1 receives a call and the call is answered through the mobile phone 1, split-screen displaying may be performed on the mobile phone 1, the original game interface is zoomed out and displayed, and the remaining space can be used to display options for the incoming call. The game and the incoming call interfaces are simultaneously displayed in two independent layers. The user may select an option for the incoming call to operate or continue playing the game. The incoming call does not affect continuing playing the game of the user.

Optionally, the game interface is a layer. An incoming call layer is newly added above the game interface layer when the mobile phone receives a call. A layer switching option is displayed on the mobile phone for the user to select the game layer or the call layer. If the user selects the game layer during answering the call, the mobile phone switches to display the game interface and hide the incoming call interface. Alternatively, the user may exit the incoming call interface by a touch operation and select the game interface to display.

In an exemplary implementation, the method further includes: detecting, by the first terminal, whether a user instruction is received within a preset first time range; receiving and sending, by the first terminal, a voice message of the second terminal to the third terminal when no user instruction is received within the preset first time range or a third instruction is received within the preset first time range, wherein the third instruction is used to indicate to reject the call with the second terminal.

Still taking the above-mentioned application scenario as an example, after the mobile phone 1 receives a call, if the user selects to reject the call or does not answer the call ultimately, the user of the mobile phone 2 may leave a voice message. The mobile phone 2 sends the voice message to the mobile phone 1, and the mobile phone 1 sends the voice message to the television. It is displayed on a voice message board of the television that the mobile phone 1 has a missed call from the mobile phone 2, and the voice message of the opposite side. After the voice message is clicked, the voice message can be played. The television may perform voice recognition, text processing, and keyword extraction, and display extracted keyword information on the message board of the television. The user of the mobile phone 1 may preset a "do not disturb" mode if the user does not want to be disturbed. When the mobile phone 1 receives a call, information of the incoming call is not displayed on the mobile phone 1, and the incoming call may be rejected automatically. Then, the mobile phone 1 sends the information of the incoming call to the television. The information of the incoming call of the mobile phone 1 is displayed on the television for the user to view a missed call record. The voice message board of the television may pop up after the incoming call is rejected, or may be pushed and displayed according to historical record viewing time of the user.

In some other exemplary application scenarios, the mobile phone 2 may be called by the mobile phone 1 or the television. In such a case, an option "call through television" may be displayed on the dialing interface of the mobile phone 1. The user may select the option to implement a call with the mobile phone 2 through the television. In addition, dialing may be performed on the television. The television acquires a dialing authority of the mobile phone 1, and it is selected to make an outgoing call through the mobile phone 1. Other devices that the mobile phone 1 can be connected with may be obtained on the television, and an option "call through another device" may be displayed after dialing on the television.

A specific implementation of making an outgoing call through the mobile phone 1 or the television may adopt the above-mentioned implementations of answering a call through the mobile phone 1. Those skilled in the art may realize various implementable functions by various transformations and variations based on the above-mentioned implementations.

Figure 21:
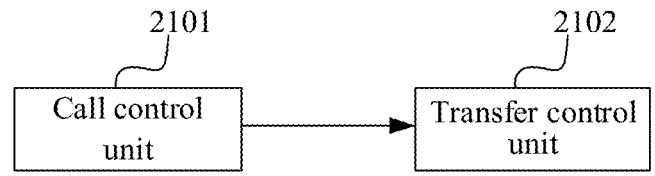
FIG. 21 is a schematic diagram of a structure of a call terminal according to an embodiment of the present disclosure.

As shown in FIG. 21, an embodiment of the present disclosure also provides a call terminal, which includes a call control unit 2101 and a transfer control unit 2102.

The call control unit 2101 is configured to receive or initiate a call request to establish a call with a second terminal.

The transfer control unit 2102 is configured to detect at least one of the following: a current task being executed by the call terminal, whether there is one or more third terminals capable of assisting in the call, and a current task being executed by the third terminal; and select whether a display interface of the call terminal displays a call assisting option according to the current task being executed by the call terminal and/or the current task being executed by the third terminal; wherein the call assisting option is used to prompt a user to select to answer the call with the second terminal through the assistance of the third terminal.

In an exemplary embodiment, the operation that the transfer control unit 2102 selects whether a display interface of the call terminal displays a call assisting option according to the current task being executed by the call terminal and/or the current task being executed by the third terminal includes: controlling a screen of the call terminal to display a first interface when the current task being executed by the call terminal is a first-level task, the first interface including an answer option, a reject option and the call assisting option; and controlling the screen of the call terminal to display a second interface when the current task being executed by the call terminal is a second-level task, the second interface including an answer option and a reject option, without the call assisting option. Herein, a priority of the first-level task is higher than that of the second-level task, and the call terminal includes any one or more of the following components: a microphone, a speaker, and a display screen.

In an exemplary embodiment, the operation that the transfer control unit 2102 selects whether a display interface of the call terminal displays a call assisting option according to the current task being executed by the call terminal and/or the current task being executed by the third terminal includes: controlling a screen of the call terminal to display a first interface when the current task being executed by the third terminal is a third-level task, the first interface including an answer option, a reject option and the call assisting option; and controlling the screen of the call terminal to display a second interface when the current task being executed by the third terminal is a fourth-level task, the second interface including an answer option and a reject option, without the call assisting option. Herein, a priority of the fourth-level task is higher than that of the third-level task, and the third terminal includes any one or more of the following components: a microphone, a speaker, and a display screen.

In an exemplary implementation, the call terminal further includes a user input unit, a microphone, a speaker, and a data transmission unit.

The user input unit is configured to receive a user instruction, the user instruction including a first instruction, a second instruction or a third instruction. Herein, the first instruction is used to request answering the call with the second terminal through the assistance of the third terminal. The second instruction is used to indicate to answer the call with the second terminal through the call terminal. The third instruction is used to indicate to reject the call with the second terminal.

The transfer control unit 2102 is further configured to, according to at least one of a user instruction, a voice call quality, a distance between the user and each terminal, position information of each terminal, and the like, select the microphone of the call terminal and/or the third terminal to collect first voice data of the user, transmit the first voice data to the second terminal through the data transmission unit of the call terminal or the third terminal, select the data transmission unit of the call terminal or the third terminal to receive second voice data of the second terminal, and play the second voice data through the speaker of the call terminal or the third terminal.

In an exemplary implementation, the call control unit 2101 is further configured to, when there are multiple third terminals, acquire position information of the multiple third terminals, and determine a display sequence of multiple call assisting options corresponding to the multiple third terminals on the display interface of the call terminal according to the position information of the multiple third terminals. Herein, the multiple third terminals correspond to the multiple call assisting options one to one.

In an exemplary implementation, the transfer control unit 2102 is further configured to, in a process that the call with the second terminal is answered through the assistance of the third terminal, detect a distance between the call terminal and the third terminal currently assisting in the call, and control a screen of the call terminal to display a switching prompting interface when the distance between the call terminal and the third terminal currently assisting in the call is greater than a first distance threshold, wherein the switching prompting interface is used to prompt switching the third terminal in the call with the second terminal.

In an exemplary implementation, the transfer control unit 2102 is further configured to, in the process that the call with the second terminal is answered through the assistance of the third terminal, detect a quality of voice information in the current call process, the quality of voice information including at least one of a data delay, packet loss or jitter, and control a screen of the call terminal and/or the third terminal to display a switching prompting interface when the quality of voice information in the current call process is lower than a preset first quality threshold of voice information, wherein the switching prompting interface is used to prompt switching the third terminal in the call with the second terminal.

In an exemplary implementation, the transfer control unit 2102 is further configured to, in the process that the call with the second terminal is answered through the assistance of the third terminal, receive a type of the current task being executed by the third terminal, and when the current task being executed includes an executed task conflicting with the current call process, send a notification of suspending the executed task conflicting with the current call process to the third terminal.

In an exemplary implementation, the transfer control unit 2102 is further arranged to, in the process that the call with the second terminal is answered through the assistance of the third terminal, receive a type of the current task being executed by the third terminal, and control a display screen of the call terminal to display a privacy protection prompting interface when the current task being executed includes an executed task except the current call process, wherein the privacy protection prompting interface is used to prompt the user to mind privacy protection.

In an exemplary implementation, the call terminal further includes a control unit, configured to control a screen of the call terminal to display a screen projection prompting interface when the call with the second terminal is answered through the call terminal, wherein the screen projection prompting interface is used to prompt whether the current task being executed by the call terminal needs to be pushed to the third terminal to be played.

In an exemplary implementation, the current task being executed is a video playing task or a game task.

In an exemplary implementation, the call terminal further includes a control unit, configured to control the display interface of the call terminal to perform split-screen displaying when the call with the second terminal is answered through the call terminal, the display interface of the call terminal including an interface for a current task being executed by the call terminal and an interface for a call process with the second terminal.

In an exemplary implementation, the call terminal further includes a control unit, configured to receive and send a voice message of the second terminal to the third terminal when the call terminal rejects or does not answer the call with the second terminal.

Figure 22:
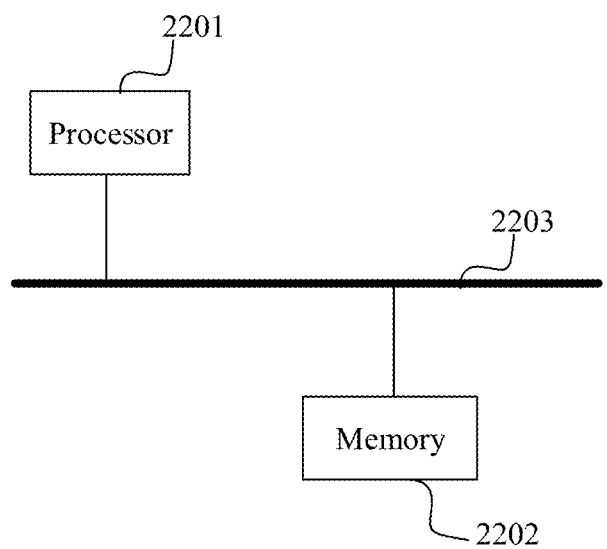
FIG. 22 is a schematic diagram of a structure of another call terminal according to an embodiment of the present disclosure.

As shown in FIG. 22, an embodiment of the present disclosure also provides a call terminal, which includes a processor 2201, a memory 2202, and a communication bus 2203.

The communication bus 2203 is configured to implement connection and communication between the processor 2201 and the memory 2202.

The processor 2201 is configured to execute one or more programs stored in the memory 2202 to implement the steps of any one call method described above.

In an exemplary implementation, the above-mentioned call terminal may further include a transmission device and an input/output device. The transmission device is connected with the above-mentioned processor. The input/output device is connected with the above-mentioned processor.

In an exemplary implementation, specific examples in the embodiment may refer to the examples described in the above embodiments and optional implementations, and will not be repeated in the embodiment.

An embodiment of the present disclosure also provides a non-transitory computer-readable storage medium, which stores one or more programs capable of being executed by one or more processors to implement the steps of any one call method described above.

In an exemplary implementation, the above-mentioned non-transitory computer-readable storage medium may include, but not limited to, various media capable of storing computer programs, such as a U disk, a Read-Only Memory (ROM), a Random Access Memory (RAM), a mobile hard disk, a magnetic disk, or an optical disk.

Figure 23:
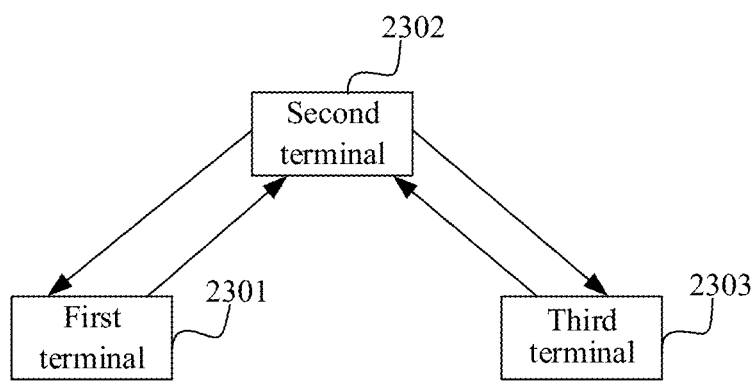
FIG. 23 is a schematic diagram of a structure of a call system according to an embodiment of the present disclosure.

As shown in FIG. 23, an embodiment of the present disclosure also provides a call system, which includes a first terminal 2301, a second terminal 2302, and one or more third terminals 2303.

The first terminal 2301 is configured to receive or initiate a call request to establish a call with the second terminal 2302, and detect at least one of the following: a current task being executed by the first terminal 2301, whether there is one or more third terminals 2303 capable of assisting in the call, and a current task being executed by the third terminal 2303; and select whether a display interface of the first terminal displays a call assisting option according to the current task being executed by the first terminal 2301 and/or the current task being executed by the third terminal 2303; wherein the call assisting option is used to prompt a user to select to answer the call with the second terminal 2302 through the assistance of the third terminal 2303.

The second terminal 2302 is configured to initiate or receive the call request to establish the call with the first terminal 2301.

The third terminal 2303 is configured to assist the first terminal 2301 in answering the call with the second terminal 2302.

It can be understood that the embodiments described in the present disclosure may be implemented by hardware, software, firmware, middleware, microcodes, or a combination thereof. In case of implementation by hardware, the processing unit may be embodied in one or more Application Specific Integrated Circuits (ASICs), Digital Signal Processors (DSPs), DSP Devices (DSPDs), Programmable Logic Devices (PLDs), Field-Programmable Gate Arrays (FPGAs), general-purpose processors, controllers, microcontrollers, microprocessors, other electronic units configured to execute the functions described in the present disclosure, or a combination thereof.

In case of implementation by software, the technology described in the present disclosure may be implemented by the units executing the functions described in the present disclosure. Software codes may be stored in the memory and executed by the processor. The memory may be embodied inside or outside the processor.

Those of ordinary skill in the art may realize that the units and algorithm steps of each example described in combination with the embodiments disclosed in the present disclosure may be implemented by electronic hardware or a combination of computer software and electronic hardware. Whether these functions are executed by hardware or software depends on a specific application and design constraints of the technical solution. The skilled artisan may use a different method to realize the described functions for each specific application, but such realization shall not be regarded as beyond the scope of the present disclosure.

Those skilled in the art can clearly know that specific working processes of the system, apparatus and units described above may refer to the corresponding processes in the above method embodiments and will not be repeated herein for the ease and brevity of description.

In the embodiments provided in the present disclosure, it is to be understood that the disclosed apparatus and method may be implemented in other ways. For example, the apparatus embodiment described above is only schematic. For example, the division of each element is only logical function division, and there may be other division ways in practical implementation. For example, multiple units or components may be combined or integrated into another system, or some features may be omitted or not executed. In addition, the coupling or direct coupling or communication connection between each other displayed or discussed may be indirect coupling or communication connection between apparatuses or units via some interfaces, and may be electrical, mechanical or in other forms.

The units described as separate parts may be or may be not physically separated. The parts displayed as units may be or may be not physical units. That is, the parts may be in the same location, or may be distributed on multiple network units. Part or all of the units may be selected according to an actual need to achieve the objective of the solution of the embodiment.

In addition, various functional units in various embodiments of the present disclosure may be integrated in a processing unit, or each unit may physically exist separately, or two or more units may be integrated in a unit.

The functions may be stored in a computer-readable storage medium when realized in form of software functional units and sold or used as an independent product. Based on such an understanding, the technical solution of the embodiments of the present disclosure in essence or the part making a contribution to the prior art or part of the technical solution may be embodied in form of a software product. The computer software product is stored in a storage medium containing a number of instructions for enabling a computer device (which may be a personal computer, a server, a network device or the like) to execute all or part of the steps of the method in each embodiment of the present disclosure. The above-mentioned storage medium includes various media capable of storing program codes, such as a U disk, a mobile hard disk, a ROM, a RAM, a magnetic disk, or an optical disk.

It is to be noted that, in the present disclosure, terms "include" and "contain" or any other variation thereof is intended to cover nonexclusive inclusions, so that a process, method, object or apparatus including a series of elements not only includes those elements, but also includes other elements which are not clearly listed, or further includes elements intrinsic to the process, the method, the object or the apparatus. Without more restrictions, an element defined by the statement "including a/an" does not exclude the existence of other same elements in a process, method, object or apparatus including the element.

Although the implementations of the present disclosure are disclosed above, the contents are only implementations for easily understanding the present disclosure and not intended to limit the present disclosure. Any person skilled in the art to which the present disclosure pertains may make any modification and variation to the form and details of the implementation without departing from the spirit and scope disclosed in the present disclosure. However, the patent protection scope of the present disclosure is still subject to the scope defined by the appended claims.

The invention claimed is:

1. A call method, comprising:
receiving or initiating, by a first terminal, a call request to establish a call with a second terminal;
detecting, by the first terminal, at least one of the following: a current task being executed by the first terminal, whether there is one or more third terminals capable of assisting in the call, and a current task being executed by a third terminal; and
selecting whether a display interface of the first terminal displays a call assisting option according to the current task being executed by the first terminal and/or the current task being executed by the third terminal, wherein the call assisting option is used to prompt a user to select to answer the call with the second terminal through the assistance of the third terminal;
wherein the selecting whether the display interface of the first terminal displays the call assisting option according to the current task being executed by the first terminal and/or the current task being executed by the third terminal comprises:
controlling a screen of the first terminal to display a first interface when the current task being executed by the third terminal is a third-level task, the first interface comprising an answer option, a reject option and the call assisting option; and
controlling the screen of the first terminal to display a second interface when the current task being executed by the third terminal is a fourth-level task, the second interface comprising an answer option and a reject option, without the call assisting option, wherein a priority of the fourth-level task is higher than that of the third-level task, and the third terminal comprises any one or more of the following components: a microphone, a speaker, and a display screen.

2. The call method according to claim 1, wherein the selecting whether the display interface of the first terminal displays the call assisting option according to the current task being executed by the first terminal and/or the current task being executed by the third terminal comprises:
controlling a screen of the first terminal to display a first interface when the current task being executed by the first terminal is a first-level task, the first interface comprising an answer option, a reject option and the call assisting option; and
controlling the screen of the first terminal to display a second interface when the current task being executed by the first terminal is a second-level task, the second interface comprising an answer option and a reject option, without the call assisting option, wherein a priority of the first-level task is higher than that of the second-level task, and the first terminal comprises any one or more of the following components: a microphone, a speaker, and a display screen.

3. The call method according to claim 1, wherein, when there are multiple third terminals, the method further comprises:
acquiring, by the first terminal, position information of the multiple third terminals, and determining a display sequence of multiple call assisting options corresponding to the multiple third terminals on the display interface of the first terminal according to the position information of the multiple third terminals, wherein the multiple third terminals correspond to the multiple call assisting options one to one.

4. The call method according to claim 1, further comprising:
receiving a first instruction, the first instruction being used to request answering the call with the second terminal through the assistance of the third terminal;
wherein the call is implemented among the first terminal, the second terminal and the third terminal in any one of the following ways:
collecting and sending, by the first terminal, first voice data to the third terminal for the third terminal to transmit the first voice data to the second terminal, and receiving and playing, by the third terminal, second voice data transmitted by the second terminal;
collecting and transmitting, by the third terminal, first voice data to the second terminal, and receiving and playing, by the third terminal, second voice data transmitted by the second terminal;
collecting and transmitting, by the third terminal, first voice data to the second terminal, receiving and sending, by the third terminal, second voice data transmitted by the second terminal to the first terminal, and playing, by the first terminal, the second voice data; or
collecting and sending, by the first terminal, first voice data to the third terminal for the third terminal to transmit the first voice data to the second terminal, receiving and sending, by the third terminal, second voice data transmitted by the second terminal to the first terminal, and playing, by the first terminal, the second voice data.

5. The call method according to claim 1, further comprising:
receiving a first instruction, the first instruction being used to request answering the call with the second terminal through the assistance of the third terminal;
wherein the call is implemented among the first terminal, the second terminal and the third terminal in any one of the following ways:
receiving and transmitting, by the first terminal, first voice data collected by the third terminal to the second terminal, and receiving and sending, by the first terminal, second voice data transmitted by the second terminal to the third terminal for the third terminal to play the second voice data;
collecting and transmitting, by the first terminal, first voice data to the second terminal, and receiving and sending, by the first terminal, second voice data transmitted by the second terminal to the third terminal for the third terminal to play the second voice data; or
receiving and transmitting, by the first terminal, first voice data collected by the third terminal to the second terminal, and receiving and playing, by the first terminal, second voice data transmitted by the second terminal.

6. The call method according to claim 4, wherein, in a process that the call with the second terminal is answered through the assistance of the third terminal, the method further comprises:
detecting, by the first terminal, a distance between the first terminal and the third terminal currently assisting in the call, and controlling a screen of the first terminal to display a switching prompting interface when the distance between the first terminal and the third terminal currently assisting in the call is greater than a first distance threshold, wherein the switching prompting interface is used to prompt switching the third terminal in the call with the second terminal.

7. The call method according to claim 1, wherein, in a process that the call with the second terminal is transferred to the third terminal, the method further comprises:
detecting, by the first terminal and/or the third terminal, a quality of voice information in a current call process, the quality of voice information comprising at least one of a data delay, packet loss or jitter, and controlling a screen of the first terminal and/or the third terminal to display a switching prompting interface when the quality of voice information in the current call process is lower than a preset first quality threshold of voice information, wherein the switching prompting interface is used to prompt switching the third terminal in the call with the second terminal.

8. The call method according to claim 1, wherein, in a process that the call with the second terminal is answered through the assistance of the third terminal, the method further comprises at least one of the following:
receiving, by the first terminal, a type of the current task being executed by the third terminal, and when the current task being executed comprises an executed task conflicting with a current call process, sending, by the first terminal, a notification of suspending the executed task conflicting with the current call process to the third terminal; or
receiving, by the first terminal, a type of the current task being executed by the third terminal, and controlling a screen of the first terminal to display a privacy protection prompting interface when the current task being executed comprises an executed task except a current call process, wherein the privacy protection prompting interface is used to prompt the user to mind privacy protection.

9. The call method according to claim 1, further comprising:
receiving a second instruction, the second instruction being used to instruct to answer the call with the second terminal through the first terminal; and
controlling a screen of the first terminal to display a screen projection prompting interface;
wherein the screen projection prompting interface is used to prompt whether the current task being executed by the first terminal needs to be pushed to the third terminal to be played.

10. The call method according to claim 9, wherein the current task being executed is a video playing task or a game task.

11. The call method according to claim 1, further comprising:
receiving a second instruction, the second instruction being used to indicate to answer the call with the second terminal through the first terminal; and
controlling the display interface of the first terminal to perform split-screen displaying, and the display interface of the first terminal comprising an interface for the current task being executed by the first terminal and an interface for a call process with the second terminal.

12. The call method according to claim 1, further comprising:
detecting, by the first terminal, whether a user instruction is received within a preset first time range; and
receiving and sending, by the first terminal, a voice message of the second terminal to the third terminal when no user instruction is received within the preset first time range or a third instruction is received within the preset first time range;
wherein the third instruction is used to instruct to reject the call with the second terminal.

13. A call terminal, comprising a processor, a memory and a communication bus; wherein
the communication bus is configured to implement connection and communication between the processor and the memory; and
the processor is configured to execute one or more programs stored in the memory to implement the steps of the call method according to claim 1.

14. A non-transitory computer-readable storage medium, storing one or more programs capable of being executed by one or more processors to implement the steps of the call method according to claim 1.

15. The call method according to claim 5, wherein, in a process that the call with the second terminal is answered through the assistance of the third terminal, the method further comprises:
detecting, by the first terminal, a distance between the first terminal and the third terminal currently assisting in the call, and controlling a screen of the first terminal to display a switching prompting interface when the distance between the first terminal and the third terminal currently assisting in the call is greater than a first distance threshold, wherein the switching prompting interface is used to prompt switching the third terminal in the call with the second terminal.

* * * * *